United States Patent
Shabtay et al.

(10) Patent No.: US 8,391,705 B2
(45) Date of Patent: Mar. 5, 2013

(54) FOLDED OPTIC, CAMERA SYSTEM INCLUDING THE SAME, AND ASSOCIATED METHODS

(75) Inventors: Gal Shabtay, Tel-Aviv (IL); Pavel Reshidko, Tel-Aviv (IL); Ephraim Goldenberg, Tel-Aviv (IL); Paul Elliott, Charlotte, NC (US)

(73) Assignee: Digitaloptics Corporation East, Charlotte, NC (US)

( * ) Notice: Subject to any disclaimer, the term of this patent is extended or adjusted under 35 U.S.C. 154(b) by 0 days.

(21) Appl. No.: 13/288,163

(22) Filed: Nov. 3, 2011

(65) Prior Publication Data

US 2012/0099848 A1  Apr. 26, 2012

Related U.S. Application Data

(63) Continuation of application No. PCT/US2010/001311, filed on May 4, 2010.

(60) Provisional application No. 61/213,085, filed on May 5, 2009.

(51) Int. Cl.
  *G03B 35/00* (2006.01)
  *G03B 15/00* (2006.01)
(52) U.S. Cl. ........................ 396/325; 396/351
(58) Field of Classification Search ................... 396/325, 396/439; 348/46, 47, 49, 340
See application file for complete search history.

(56) References Cited

U.S. PATENT DOCUMENTS

| | | | | |
|---|---|---|---|---|
| 5,300,263 | A * | 4/1994 | Hoopman et al. | 264/2.5 |
| 5,768,023 | A * | 6/1998 | Sawaki et al. | 359/622 |
| 5,886,822 | A | 3/1999 | Spitzer | |
| 5,978,015 | A * | 11/1999 | Ishibashi et al. | 348/47 |
| 7,689,116 | B2 * | 3/2010 | You et al. | 396/322 |
| 7,796,187 | B2 * | 9/2010 | Shangguan et al. | 348/374 |
| 2003/0090753 | A1 | 5/2003 | Takeyama et al. | |
| 2003/0198444 | A1 | 10/2003 | Mine et al. | |
| 2004/0032523 | A1 | 2/2004 | Hartlove et al. | |
| 2005/0046952 | A1 | 3/2005 | Nagata et al. | |
| 2007/0275505 | A1 | 11/2007 | Wolterink et al. | |
| 2008/0273239 | A1 | 11/2008 | Jin et al. | |
| 2012/0099848 | A1 * | 4/2012 | Shabtay et al. | 396/322 |

OTHER PUBLICATIONS

International Search Report PCT/US2010/001311 published as WO 2010/129039.

* cited by examiner

*Primary Examiner* — W. B. Perkey
(74) *Attorney, Agent, or Firm* — Lee & Morse, P.C.

(57) ABSTRACT

A camera system includes an optical assembly including a folded optic, the folded optic including a transparent support substrate, a first lens surface on a first surface of the transparent support substrate, and a second lens surface on the first surface of the transparent support substrate, at least one of the first and second lens surfaces including a replication material, and a sensor configured to receive light from the optical assembly that has been incident on both the first and second lens surfaces sequentially.

24 Claims, 6 Drawing Sheets

Table 1

| Surface | Radius | Thickness | Material | Diameter | Conic |
|---|---|---|---|---|---|
| OBJECT | Infinity | Infinity | | 0 | 0 |
| 1 | Infinity | 1.388889 | | 4.211546 | 0 |
| 2 | | 0 | | | |
| STOP | 1.456211 | 0 | DISP1 | 0.3611111 | 18.81114 |
| 4 | | 0.1214407 | | | |
| 5 | Infinity | 0.35 | SUB | 3.146517 | 0 |
| 6 | Infinity | 0.4534781 | DISP2 | 3.066895 | 0 |
| 7 | | 0 | | | |
| 8 | -45.70885 | 0 | MIRROR | 2.389438 | 0 |
| 9 | | -0.4534781 | | | |
| 10 | Infinity | -0.35 | SUB | 2.820529 | 0 |
| 11 | Infinity | -0.09233151 | DISP1 | 2.556001 | 0 |
| 12 | | 0 | | | |
| 13 | 3.535359 | 0 | MIRROR | 1.431966 | 0 |
| 14 | | 0.09233151 | | | |
| 15 | Infinity | 0.35 | SUB | 2.335339 | 0 |
| 16 | Infinity | 0.177782 | DISP2 | 2.021744 | 0 |
| 17 | | 0 | | | |
| 18 | -1.55939 | 0 | | 0.9025216 | 0 |
| 19 | | 0.3062627 | | | |
| 20 | | 0.15 | | | |
| IMAGE | Infinity | | | 1.548189 | 0 |

FIG. 2A

Table 2_3

| i | A_i |
|---|---|
| 2 | 0 |
| 4 | 0.81321198 |
| 6 | -0.49368246 |
| 8 | -123.97658 |
| 10 | 928.63232 |
| 12 | 0 |
| 14 | 0 |
| 16 | 0 |

Table 2_8

| i | A_i |
|---|---|
| 2 | 0 |
| 4 | 0.031886899 |
| 6 | -0.026695749 |
| 8 | 0.01514736 |
| 10 | -0.0033389177 |
| 12 | 0 |
| 14 | 0 |
| 16 | 0 |

Table 2_13

| i | A_i |
|---|---|
| 2 | 0 |
| 4 | -0.026940802 |
| 6 | 0.33432245 |
| 8 | -1.5397342 |
| 10 | 3.4169028 |
| 12 | -3.8012987 |
| 14 | 1.6455547 |
| 16 | 0 |

Table 2_18

| i | A_i |
|---|---|
| 2 | 0 |
| 4 | 3.6972733 |
| 6 | -36.901885 |
| 8 | 217.45418 |
| 10 | -692.90568 |
| 12 | 1125.6649 |
| 14 | -733.87078 |
| 16 | 0 |

FOLDED OPTIC, CAMERA SYSTEM INCLUDING THE SAME, AND ASSOCIATED METHODS

CROSS-REFERENCE TO RELATED APPLICATIONS

This application is a continuation of International Application No. PCT/US2010/001311, entitled "Folded Optic, Camera System Including the Same, and Associated Methods," which was filed on May 4, 2010, the entire contents of which are hereby incorporated by reference, and which claims priority to U.S. Provisional Application No. 61/213,085, filed May 5, 2009, the entire contents of which are incorporated by reference for all purposes.

1. FIELD

Example embodiments relate to a camera system. More particularly, example embodiments relate to a camera system including a folded optic and associated methods.

2. BACKGROUND OF THE INVENTION

The size and cost of solid state camera system is primarily determined by the lens assembly. Increasing a number of lenses used in the camera system may increase performance, but also may increase the thickness and cost of the camera system.

SUMMARY

Example embodiments are therefore directed to a folder optic, a camera system including the folded optic, and associated methods, which substantially overcome one or more of the problems due to the limitations and disadvantages of the related art.

It is therefore a feature of example embodiments to provide a single lens as a lens assembly providing imaging in a camera system.

It is another feature of example embodiments to provide a thinner lens assembly providing imaging in a camera system.

It is yet another feature of example embodiments to provide a cheaper lens assembly providing imaging in a camera system.

At least one of the above and other features and advantages may be realized by providing a camera system including an optical assembly including a folded optic and a sensor. The folded optic includes a transparent support substrate, a first lens surface on a first surface of the transparent support substrate, and a second lens surface on the first surface of the transparent support substrate, at least one of the first and second lens surfaces including a replication material. The sensor is configured to receive light from the optical assembly that has been incident on both the first and second lens surfaces sequentially.

The camera system may include another support substrate secured along a z-axis to the support substrate, the another support substrate including a reflective surface.

The first lens surface may be a plano-convex surface and the second lens surface may be reflective.

The optical assembly may further include a third lens surface on a second surface of the transparent support substrate, the second surface being opposite the first surface, the sensor configured to receive light from the first, third, and second lens surfaces sequentially. The first lens surface may be in a first material, the second lens surface may be in a second material, and the third lens surface may be in a third material, different from the first material. The second material may be the same as the first material, the first material and the substrate may have substantially equal refractive indexes, and the third material may have a greater refractive index than the first material and the substrate.

The optical assembly further includes a fourth lens surface on the second surface of the transparent support substrate, the sensor being configured to receive light from the optical assembly that has been incident on the first, third, second, and fourth surfaces, sequentially. The first lens surface may be a first plano-convex surface, an aperture stop of the folded optic being at the first plano-convex surface, the second lens surface may be a first concave reflecting surface, the third lens surface may be a second plano-convex surface, and the fourth lens surface may be a second convex reflecting surface. The first to fourth surfaces all may be aspheric and have optical power, with only the first plano-convex surface having a positive conic constant.

The sensor may include a solid-state detector and a microlens array.

The camera system may include a third lens surface and a fourth surface on the first surface of the substrate, and another sensor configured to receive light from the optical assembly that has been incident on both the third and fourth lens surfaces sequentially. The third and fourth lens surfaces may be mirror images of the first and second lens surfaces.

At least one of the above and other features and advantages may be realized by providing a method of making a camera system, the method including forming a first lens surface on a first surface of a transparent support substrate, forming a second lens surface on the first surface of a transparent support substrate, at least one forming the first and second lens surfaces includes replicating, and providing a sensor configured to receive light that has been incident on the first and second lens surfaces sequentially.

Forming may include forming the second lens surface on the transparent support substrate, patterning a reflective material on a portion of the second lens surface, and replicating the first lens surface on the second lens surface after patterning the reflective material.

Forming the second lens surface may include replicating the second lens surface in a first material. Forming the first lens surface may include replicating the first lens surface in a second material different from the first material.

Forming the second lens surface may include transferring the second lens surface into the transparent support substrate.

The method may include forming a third lens surface on a second surface of the transparent support substrate, the second surface being opposite the first surface, the sensor configured to receive light from the first, third, and second lens surfaces sequentially.

The method may include forming a fourth lens surface on a second surface of the transparent support substrate, the sensor being configured to receive light from the optical assembly that has been incident on the first, third, second, and fourth lens surfaces sequentially. The first lens surface may be formed in a first material, a second lens surface may be formed in a second material, and the third lens surface may be formed in a third material, different from the first material.

Forming the first and second lens surfaces may include forming a plurality of at least one of the first and second lens surfaces simultaneously on a first wafer. Providing the sensor may include providing a plurality of sensors on a second wafer, aligning and securing the first and second wafers, and singulating the first and second wafers to form individual cameras. Individual cameras may be dual cameras, including two first lens surfaces, two second lens surfaces, and two sensors.

Forming the first and second lens surfaces may include forming the first lens surface in a first material and the second lens surface in a second material, different from the first material.

At least one of the above and other features and advantages may be realized by providing a camera system having a folded optic providing more than two surfaces having optical power therein on a single substrate and a sensor. The folded optic may include a transparent, rigid substrate having opposing first and second surfaces, a first replicated lens in a first material on the first surface of the substrate, the first replicated lens having a first plano-convex surface and a first concave reflecting surface, an aperture stop of the folded optic being at the first plano-convex surface, a second replicated lens in a second material, different from the first material, on the second surface of the substrate, the second replicated lens having a second plano-convex surface and a second convex reflecting surface, light from an object side traversing the folded optic in order of the first plano-convex surface, the second concave reflecting surface, the first convex reflecting surface, and the second plano-convex surface, wherein the first plano-convex surface, the second concave reflecting surface, the first concave reflecting surface, and the second plano-convex surface are all aspheric and all have optical power, with only the first plano-convex surface having a positive conic constant, the first plano-convex surface has the following aspheric coefficients

| i | A_i |
|---|---|
| 2 | 0 |
| 4 | 0.81321198 |
| 6 | −0.49368246 |
| 8 | −123.97658 |
| 10 | 928.63232 |
| 12 | 0 |
| 14 | 0 |
| 16 | 0 | the first concave reflecting surface has the following aspheric coefficients

| i | A_i |
|---|---|
| 2 | 0 |
| 4 | −0.026940802 |
| 6 | 0.33432245 |
| 8 | −1.5397342 |
| 10 | 3.4169028 |
| 12 | −3.8012987 |
| 14 | 1.6455547 |
| 16 | 0 | the second plano-convex has the following aspheric coefficients

| i | A_i |
|---|---|
| 2 | 0 |
| 4 | 3.6972733 |
| 6 | −36.901885 |
| 8 | 217.45418 |
| 10 | −692.90568 |
| 12 | 1125.6649 |
| 14 | −733.87078 |
| 16 | 0 | the second convex reflecting surface has the following aspheric coefficients

| i | A_i |
|---|---|
| 2 | 0 |
| 4 | 0.031886899 |
| 6 | −0.026695749 |
| 8 | 0.01514736 |
| 10 | −0.0033389177 |
| 12 | 0 |
| 14 | 0 |
| 16 | 0 | the first material has a higher Abbe number than the second material, the first material and the substrate have substantially equal refractive indexes, the second material having a greater refractive index than the first material and the substrate, and the folded optic has a focal length of 1 mm. The sensor may be configured to receive light output from the second plano-convex surface of the folded optic, and may include a solid-state detector and a microlens array.

BRIEF DESCRIPTION OF THE DRAWINGS

The above and other features and advantages of example embodiments will become more apparent to those of ordinary skill in the art by describing in detail with reference to the attached drawings, in which.

DETAILED DESCRIPTION

Example embodiments will now be described more fully hereinafter with reference to the accompanying drawings, in which preferred embodiments of the invention are shown; however, example embodiments may be embodied in different forms and should not be construed as limited to the embodiments set forth herein. Rather, these example embodiments are provided so that this disclosure will be thorough and complete, and will fully convey the concept of the invention to those skilled in the art.

As used herein, the term "wafer" should be understood as meaning any substrate on which a plurality of components are formed which are to be vertically separated prior to final use. Further, as used herein, the term "camera system" should be understood as meaning any system including an optical imaging system relaying optical signals to a detector, e.g., an image capture system, which outputs information, e.g., an image. Further, as used herein, the term "folded optic" should be understood as meaning an optical system in which the beam is bent to render the optical path much longer than the thickness of the optical system.

In accordance with example embodiments, a folded optic may include at least two lens surfaces on a same support surface of a support substrate that are different from one another, but all having optical power therein. When used in a camera system, light being imaged will be sequentially incident on the at least two lens surfaces of the folded optic.

In accordance with example embodiments, discussed in detail below, a single complex lens providing more than two lens surfaces having optical power therein may be formed on opposing support surfaces of a support substrate. The more than two lens surfaces having optical power therein may be formed using a single replication step on each support surface of the substrate.

Thus, using a folded optic, as discussed in detail below, may allow improved performance by having multiple lens surfaces with optical power, while reducing cost and thickness of the overall optical system compared to a conventional optical system providing a same number of support surfaces.

Figure 1:
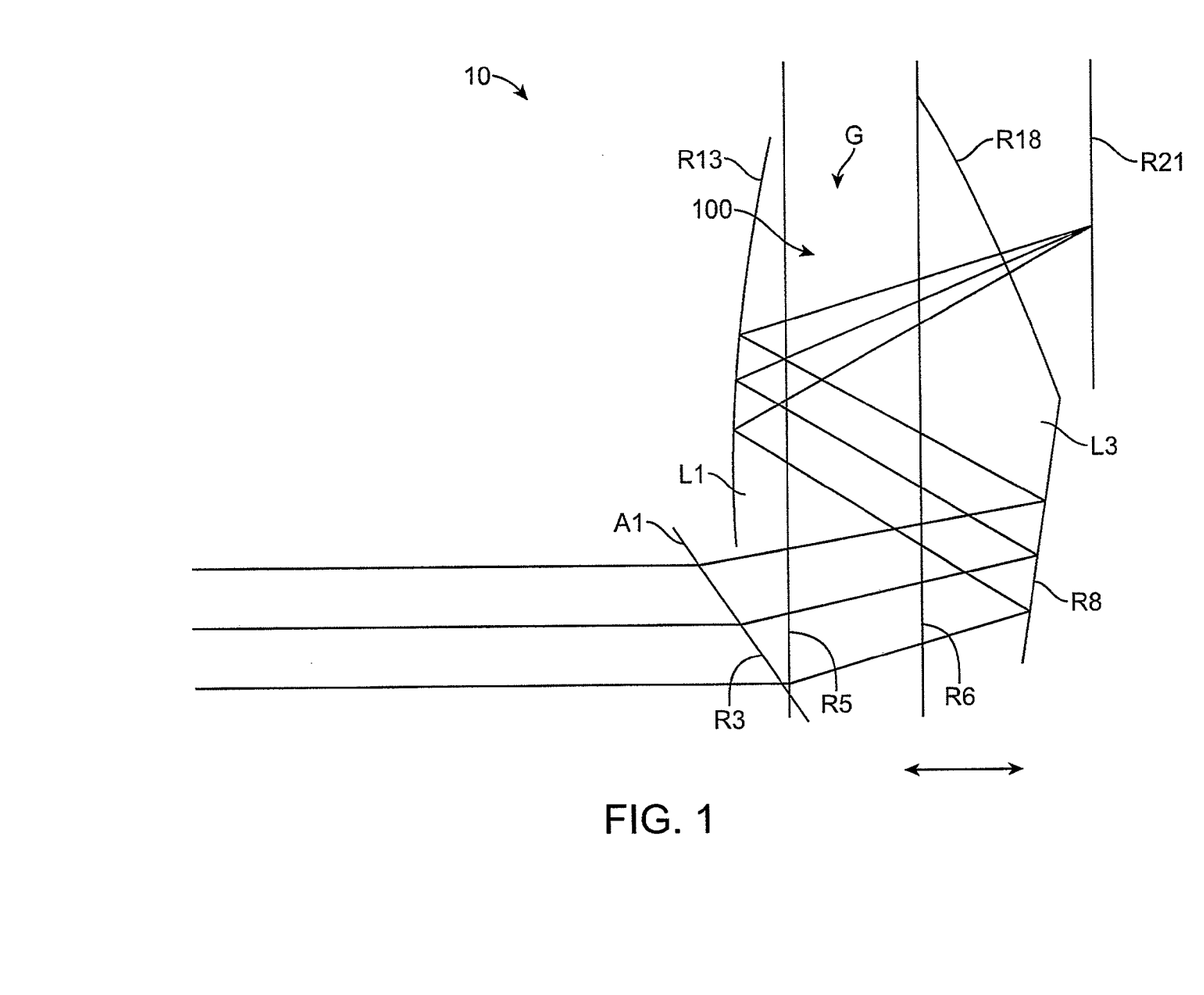
FIG. 1 illustrates a cross-sectional view of a camera system including a folded optic in accordance with an example embodiment.

Referring to FIG. 1, a camera system 10 may include a single complex lens 100 and a sensor R21. The single complex lens 100 may be used in place of a conventional lens assembly. The single complex lens 100 may be a folded optic, i.e., including reflective portions for reducing the physical length of the optical system. The folded optic 100 may be translated along the z-axis relative to the sensor R21, as indicated by the double headed arrow, to adjust focus thereof. In FIG. 1, Ri indicates an i-th surface.

In more detail, the folded optic 100 may include a substrate G having opposing first and second planar parallel surfaces R5 and R6. The first and second planar parallel surfaces R5 and R6 may have first and second lenses L1 and L2 formed thereon, respectively. In particular, the folded optic 100 may include two Cassegrainian-like reflecting surfaces R13 and R8, and two plano-convex surfaces R3 and R18 on respective first and second surfaces R5 and R6. As illustrated in FIG. 1, these first and second reflecting surfaces R13 and R8 may be diagonally opposite one another on the first and second surfaces R5 and R6 of the substrate G, and the first and second plano-convex surfaces R3 and R18 may also be diagonally opposite one another on first and second surfaces R 5 and R6 of the substrate and adjacent respective reflecting surfaces R13 and R8. In other words, as is evident from the surface numbering from the object side to the image side, light may be incident on the first plano-convex surface R3, the second reflecting surface R8, the first reflecting surface R13, and output from the second plano-convex surface R18.

All lens surfaces R3, R8, R13, and R18 may have some optical power. While the lens surfaces as illustrated in FIG. 1 may have abrupt transitions therebetween, these are not in the optical path of light traversing the folded optic 100, and may be resolved in numerous manners, e.g., blending, with particular consideration as to ease of formation of the first and second lenses L1 and L2.

As illustrated in FIG. 1, light enters the single optic 100 through an aperture stop A1 to be incident on the first plano-convex lens surface R3 having positive power, which directs light to the second reflecting surface R8, here a convex mirror. Light is then reflected by the second reflecting surface R8 towards the first reflecting surface R13, here a concave mirror. Light reflected by the first reflecting surface R13 is then focused by the second plano-convex surface R18 onto a sensor R21.

The first lens L1 may include the first plano-convex surface R3 and the first reflecting surface R13. The second lens L2 may include the second plano-convex surface R18 and the second reflecting surface R18. The first and second lenses L1 and L2 may be formed of a replication material, i.e., a material that may be replicated, e.g., molded, stamped, embossed, and so forth, using a master, on respective surfaces R5 and R6 of the substrate G. The master may be formed as a wafer or may be first formed as a submaster for each surface and/or each lens and then used to form an array thereof to create the master.

The first and second lenses L1 and L2 may be formed in different replication materials. The replication materials used for the first and second lenses L1 and L2 may be weakly dispersive, while the material for the substrate G may be a highly dispersive material. Chromatic aberration may only arise due to the first and second plano-convex surfaces R3 and R18, as the reflectivity of the reflecting surfaces R8 and R13 may be relatively uniform across the visible wavelength range. If, for a particular use, chromatic correction is needed, a chromatic correcting element, e.g., a diffractive element, may be employed and/or the final surface R18 may provide negative power.

A replication material may be a deformable but curable material, e.g., heat curable, ultraviolet (UV) curable, or injection moldable. Examples of replication materials include epoxides/oxetanes, acrylates/methacrylates, maleate esters, thiol/ene, vinyl ether, perfluorocyclobutyl, urethane/acrylates/methacrylates, siloxanes, and hybrids thereof.

A master may be made of a variety of materials capable of providing sufficient structural detail for the micro-optical device and sufficiently durability for multiple uses. For example, the master may be made of a material having some elasticity, but sufficient mechanical strength, e.g., polydimethylsiloxane (PDMS) or Teflon. The master may also be made of a rigid material, e.g., a metal alloy, such as a nickel alloy, a semiconductor material or a ceramic. The master may be opaque to wavelengths needed to cure a replication material used, e.g., metal or metal alloys, or may be transparent to these wavelengths, e.g., PDMS, Teflon, silicon.

The substrate G may be a rigid, transparent material, e.g., any of a variety of glasses. The lenses L1 and L2 may be formed simultaneously or sequentially on the substrate G. The substrate G may be part of a wafer, and a plurality of first and second lenses may be created on the wafer, which may then be singulated to form a plurality of individual folded optics 100. Replication material remaining after formation of the first and second lenses L1 and L2 may be removed before singulation to make singulation easier and to reduce stress on the first and second lenses L1 and L2. While the surfaces of the first and second lenses have been indicated as being in the same material, respectively, the surfaces making up the first and second lenses may themselves be in different materials, e.g., plano-convex surfaces R3 and R18 and the reflecting surfaces R8 and R13 may all be in different materials.

After formation, the surfaces of the first and second lenses L1 and L2 may be coated with a reflective material, e.g., by sputtering metal, at respective portions corresponding to the first and second reflecting portions R13 and R8 to form the folded optic 100. When the cover glass CG is to be used, the cover glass CG may be part of a wafer to be aligned with a wafer containing the folded optic 100 or may be provided on individual folded optics 100 after singulation.

The sensor R21 may be an individual sensor to be picked and placed adjacent each individual folded optic 100, i.e., opposite lens surface R18, either before or after singulation, or may be part of an array of sensors on a wafer to be aligned with a wafer containing the individual optics 100. The sensor R21 may include a solid state detector, e.g., a CCD, a CMOS, and so forth, and a microlens array. In either scenario, the sensor substrate/wafer, with or without the cover glass CG, may be secured to the folded optic substrate/wafer, along the z-axis, e.g., using a bonding material therebetween, glass fusion, and so forth.

Specific examples of a design for the folded optic 100 will now be described in detail below.

The surfaces R3, R8, R13, and R18 may be aspheric and defined by a following aspheric equation:

$$Z = \frac{CY^2}{1+\sqrt{1-KC^2Y^2}} + \sum_i A\_i Y^i$$

Where Z is the length (in mm) of a line drawn from a point on the aspheric lens surface at a distance Y from the optical axis to the tangential plane of the aspheric surface vertex, C is the curvature of the aspheric lens surface on the optical axis, Y is the distance (in mm) from the optical axis, K is the conic constant, A_i is the ith aspheric coefficient, and the summation extends over even number i.

Figure 2A:
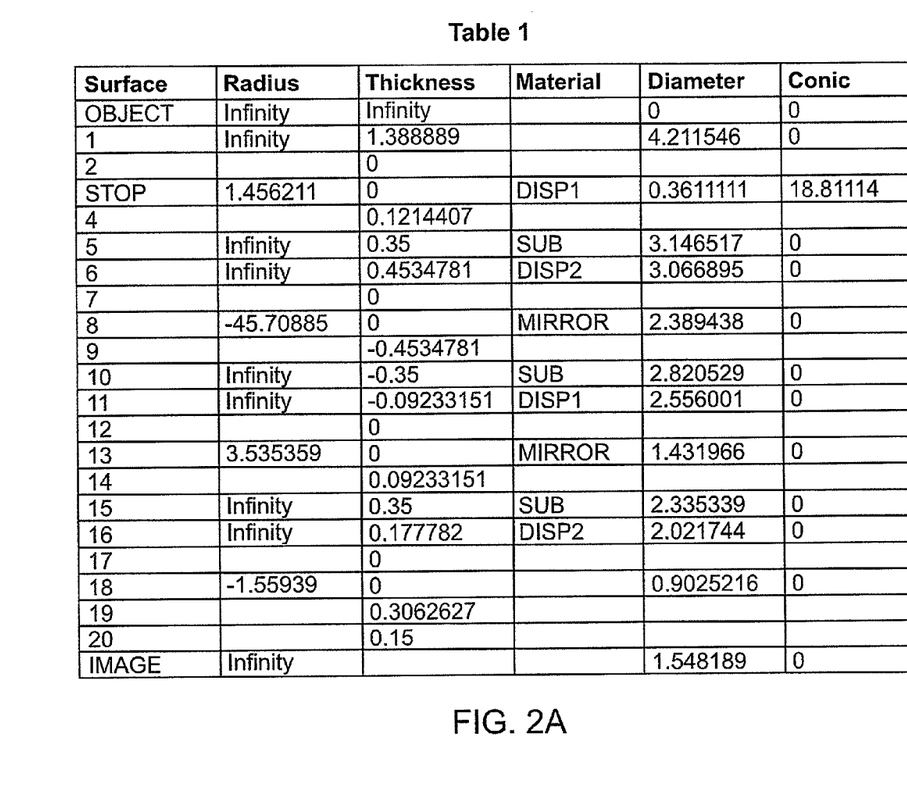
FIGS. 2A and 2B illustrate tables for a specific example of a camera system using a folded optic in accordance with an example embodiment.
Figure 2B:
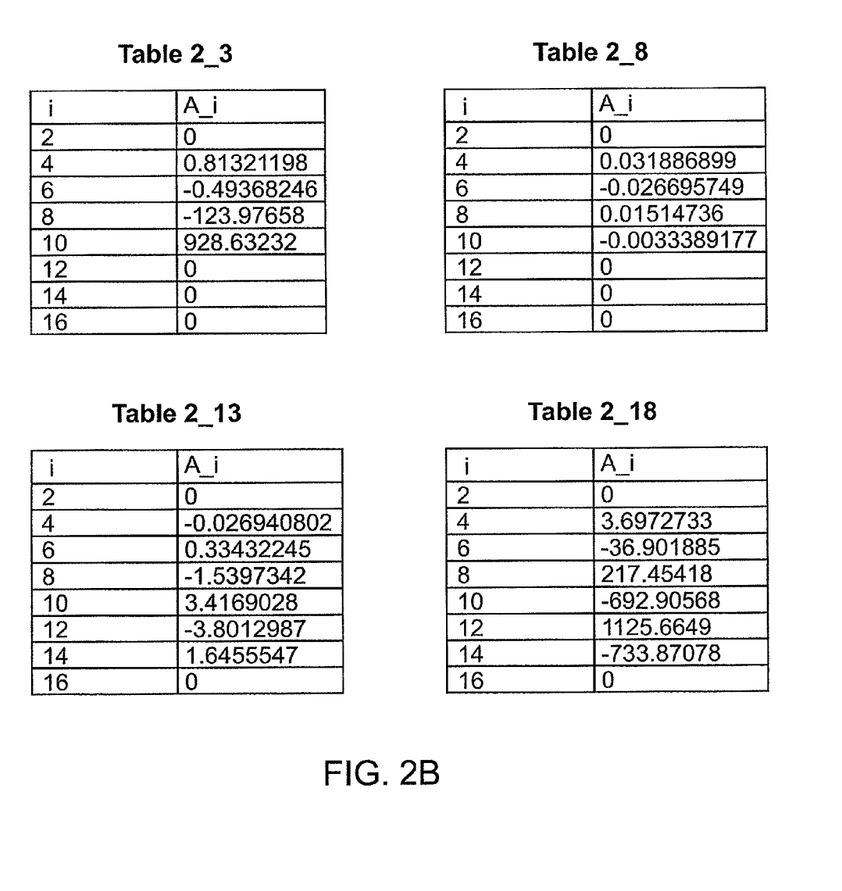

FIGS. 2A and 2B illustrate a specific example of the optics 100 that may be used with camera system having a VGA sensor with a 1.4 micron pixel size and an F number of 2.9. In FIG. 2A, Table 1 lists the surface number in order from the object side, the radius of curvature R (in mm) of each surface near the optical axis, the distance between surfaces, the lens diameter, and the material used for each lens. In FIG. 2B, Table 2_3, Table 2_8, Table 2_13, and Table 2_18 list the values of the constants A_i, for i=2, 4, 6, 8, 10, 12, 14, 16 used in the equation above for the aspheric surfaces R3, R8, R13, and R18, respectively.

According to the specific example, materials used for may satisfy n1=n2<n3, e.g., n1=n2=1.52, n3=1.56, where a first dispersive material DISP1 on the object side has a refractive index n1, a substrate material SUB has a refractive index n2, and a second dispersive material on the image side DISP2 has a refractive index n3. The first dispersive material DISP1 may have an Abbe number of 50.9, the substrate material SUB may have an Abbe number of 62, and the third dispersive material DISP2 may have an Abbe number of 36. Additionally, the focal length of the entire lens system may be f=1 mm and the total track length TTL=1 mm. When the cover glass CG indicated in Table 1 is used, the TTL/image size=0.89.

Figure 3:
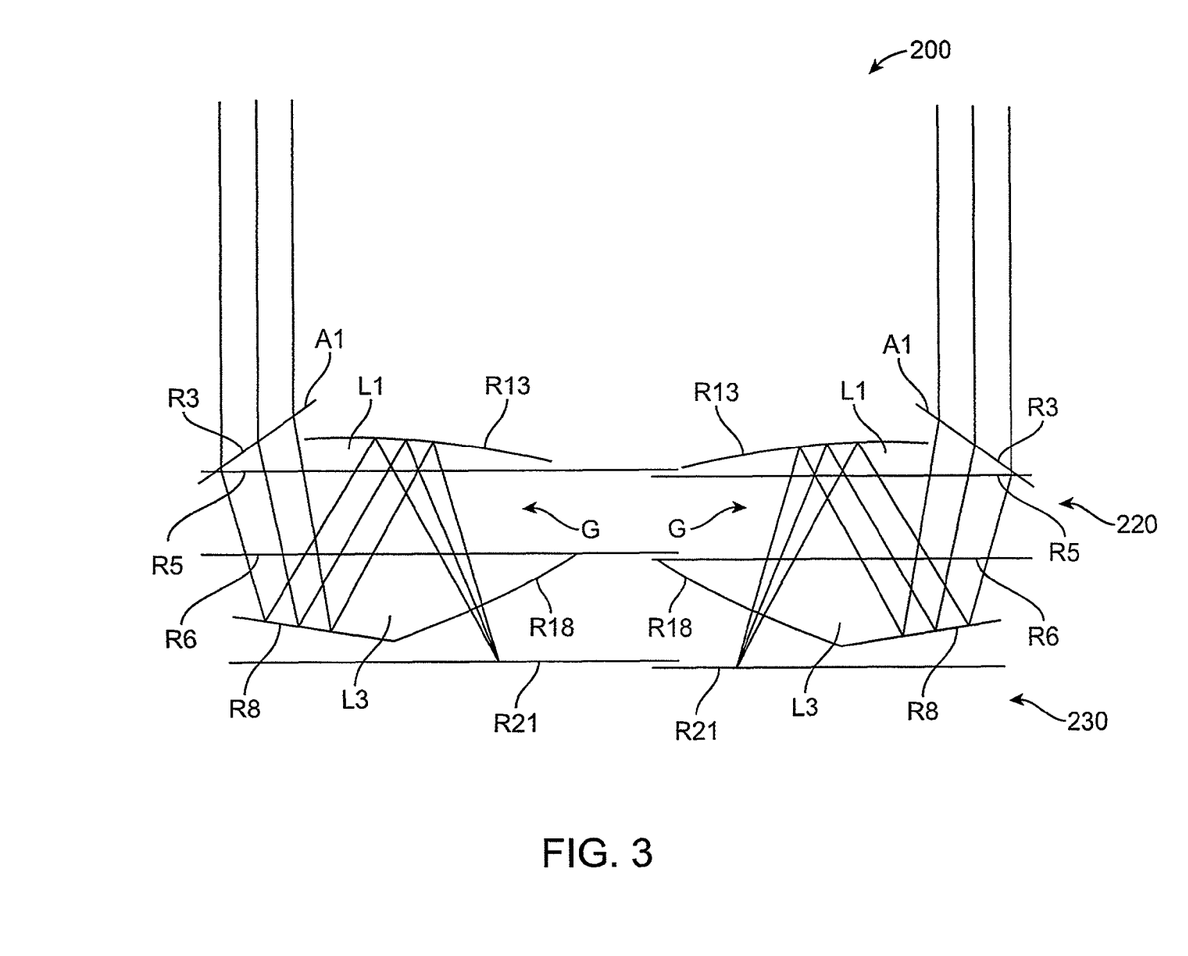
FIG. 3 illustrates a cross-sectional view of a dual camera system including a folded optic in accordance with an example embodiment.

FIG. 3 illustrates a cross-sectional view of a dual camera system 200 in accordance with an embodiment. The dual camera system 200 may include a first camera 210 including a folded optic and a second camera 250 including a folded optic. Such a dual camera system 200 may form part of a 3D camera where two light gathering lenses resemble human eyes and are spaced apart appropriately, e.g., 6-7 cm. The two image sensors may be manufactured on a single chip, and therefore are located with much smaller distance then the light gathering lenses.

As illustrated in FIG. 3, the first and second cameras 210, 250 may be mirror images of one another and may include the folded optic 100 of FIG. 1. The first and second cameras 210, 250 may be formed adjacent one another separated along the y-axis on common substrates 220 and 230. The first and second cameras function as discussed above with reference to FIG. 1, and a detailed description thereof will not be repeated.

These common substrates 220, 230 may be from respective wafers secured together along the z-axis, e.g., in planar peripheral regions of the common substrates in each dual camera, to form a plurality of dual cameras 200. The secured wafers may then be singulated along the z-axis to form individual dual cameras 200.

While the use of the folded optic 100 on a single substrate may enable a thinner lens assembly and reduce the cost of the camera, embodiments are not limited thereto. For example, the first lens L1 may be formed on a surface of a first substrate and the second lens L2 may be formed on a surface of a second substrate. These substrates may be secured together along the z-axis at the wafer level and then singulated, before or after having sensors secured thereto.

Figure 4:
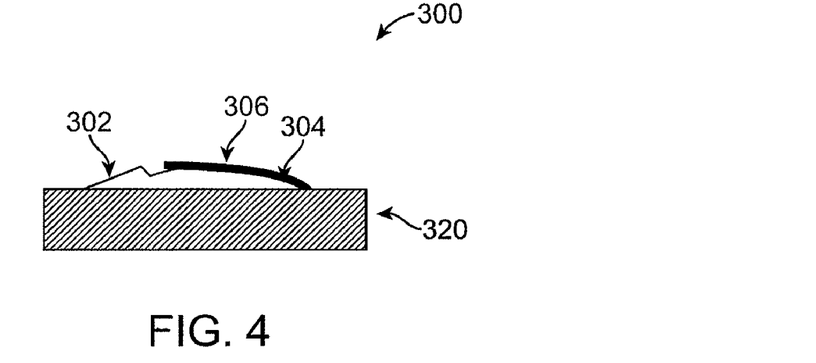
FIG. 4 illustrates an cross-sectional view of an optical element for use in a folded optic in accordance with an embodiment.

As noted above, a folded optic may require a complex lens shape with a partially patterned aperture. In addition to the replication discussed above, the same optical surfaces may be made by overmolding. FIG. 4 illustrates a cross-section of a complex lens 300 to be created. As illustrated in FIG. 4, the complex lens 300, which corresponds to the first lens shape L1 in FIG. 1, includes a first lens surface 302 and second lens surface 304 on a first support surface 322 of a substrate 320. The first lens surface 302 is transparent and the second lens surface has a reflective coating 306 thereon.

Figure 5A:
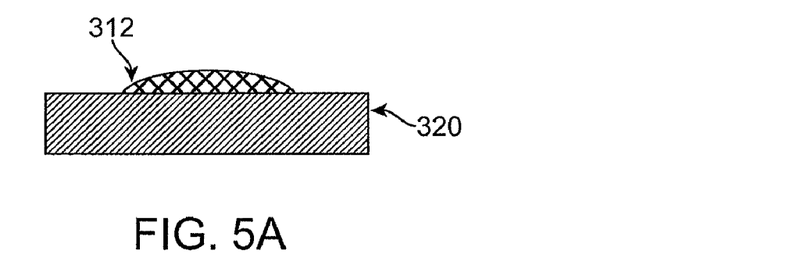
FIGS. 5A to 5C illustrate cross-sectional views of stages in a method for making the optical element illustrated in FIG. 4 in accordance with an embodiment.
Figure 5B:
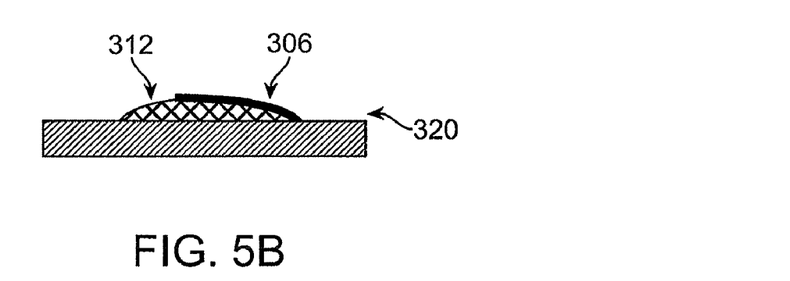
Figure 5C:
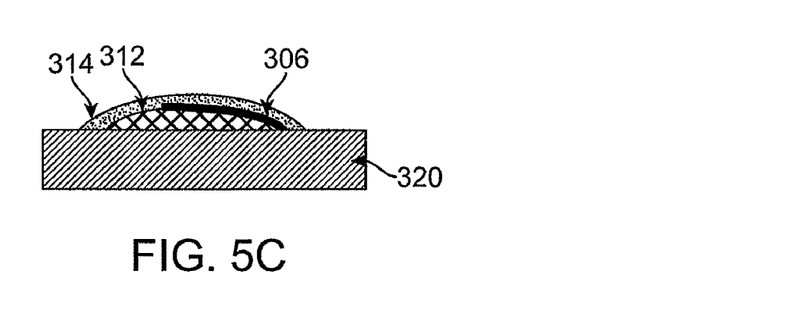

FIGS. 5A to 5C illustrate cross-sectional views of stages in an overmolding method of making the complex lens shape of FIG. 4 in accordance with an embodiment. As illustrated in FIGS. 5A to 5C, the complex lens shape 300 of FIG. 4A may be formed by replicating two simple lens shapes.

In particular, as illustrated in FIG. 5A, a first simple lens shape 312 may be formed, e.g., replicated, on the substrate 320 in a first material. As illustrated in FIG. 5B, a reflective coating may be partially patterned on the first simple lens shape 312 to provide the reflective coating 306 of the second lens surface 304. Then, as illustrated in FIG. 5C, the first simple lens shape 312 having the reflective coating 306 thereon may be overmolded with a second simple lens shape 314 in a second material. Thus, the first lens surface 302 maybe realized by the combination of the first simple lens shape 312 with no reflective coating thereon and the second simple lens shape 314 overmolded thereon. The first and second materials may be different, as illustrated in FIG. 5C, or they may be the same.

FIGS. 6A to 6D illustrate cross-sectional views of stages in an overmolding method of making the complex lens shape of FIG. 4 in accordance with another embodiment. As illustrated in FIGS. 6A to 6D, the complex lens shape 300 of FIG. 4 may be formed by overmolding a second simple lens shape on a first simple lens shape.

Figure 6A:
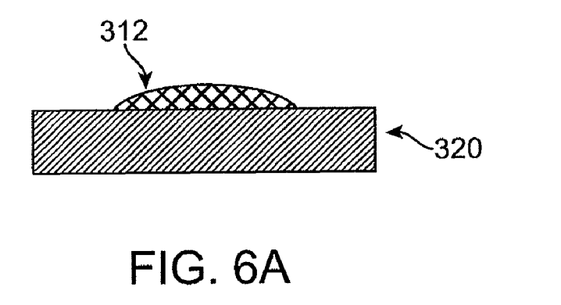
FIGS. 6A to 6D illustrate cross-sectional views of stages in a method for making the optical element illustrated in FIG. 4 in accordance with another embodiment.
Figure 6B:
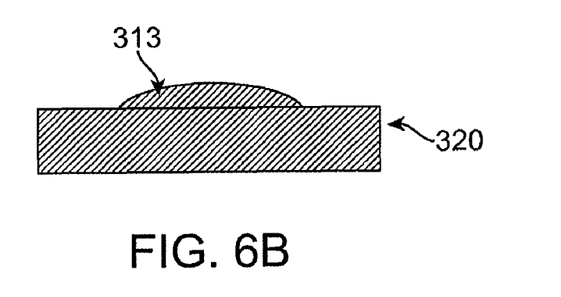
Figure 6C:
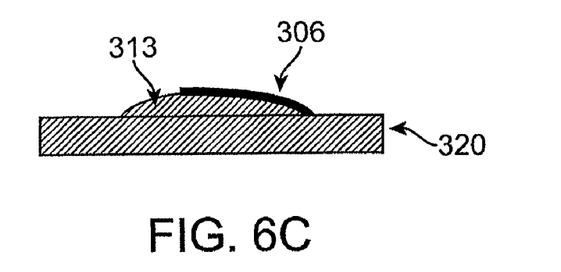
Figure 6D:
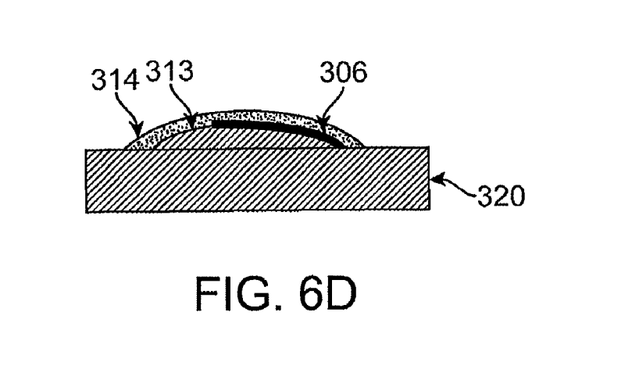

In particular, as illustrated in FIG. 6A, the first simple lens shape 312 may be formed, e.g., replicated, on the substrate 320. As illustrated in FIG. 6B, the first simple lens shape 312 may be transferred into the substrate 320 to form an integral first simple lens shape 313. Then, as illustrated in FIG. 6C, a reflective coating may be partially patterned on the integral first simple lens shape 313 to provide the reflective coating 306 of the second lens surface 304. Then, as illustrated in FIG. 6D, the integral first simple lens shape 313 having the reflective coating 306 thereon may be overmolded with a second simple lens shape 314. Thus, the first lens surface 302 may be realized by the combination of the integral first simple lens shape 313 with no reflective coating thereon and the second simple lens shape 314 overmolded thereon.

Depending on the particular design, the first and second simple lens shapes may be in the same material or in different materials. Further, this sequence and structure also may be applicable to many other designs, e.g., may be scaled by repeating the number of overmolding steps and partial apertures.

Embodiments relate to a single complex lens based on a folded optic, which is suitable to be used in portable equipment, e.g., a camera phone or similar devices employing a solid state imaging device. Compared with a conventional optical system, the number of components of the imaging lens assembly in accordance with embodiments may be reduced to one, while providing more than two optical surfaces having optical power. As a result, a thinner and/or cheaper lens assembly, resulting in a thinner and/or cheaper camera, may be realized.

Embodiments also relate to providing two lens surfaces having optical power therein formed on the same support surface of a support substrate. The two lens surfaces having optical power therein may be formed using a single replication step on the support substrate, multiple parallel replication steps, or by overmolding. Thus, improved performance may be realized by having multiple surfaces with optical power, while reducing cost and thickness of the overall optical system compared to a conventional optical system providing a same number of support surfaces.

In the figures, the thickness of layers, regions, substrates, etc., are exaggerated for clarity. It will be understood that when an element such as a layer, a region, or a substrate is referred to as being "on" another element, it can be directly on the other element or intervening elements may also be present. In contrast, when an element or layer is referred to as being "directly on," "directly connected to" or "directly coupled to" another element or layer, there are no intervening elements or layers present. Further, it will be understood that when a layer, region, or substrate is referred to as being "under" or "above" another layer, it can be directly under or directly above, and one or more intervening layers, regions, substrates may also be present. In addition, it will also be understood that when a layer is referred to as being "between" two layers, it can be the only layer between the two layers, or one or more intervening layers may also be present. Further, when it is described that a unit "includes" a constituent element, it means that the unit may further include other constituent elements in addition to the element unless specifically referred to the contrary. Like numbers refer to like elements throughout. As used herein, the term "and/or" includes any and all combinations of one or more of the associated listed items.

It will also be understood that, although the terms "first" and "second" etc. may be used herein to describe various elements, regions, substrates or layers, and should not be limited by these terms. These terms are only used to distinguish an element, region, substrates or layer from another elements, regions, substrates or layers. Thus, a first element, region, substrates or layer discussed herein could be termed a second element, region, substrates or layer without departing from the teachings of example embodiments.

Example embodiments have been disclosed herein, and although specific terms are employed, they are used and are to be interpreted in a generic and descriptive sense only and not for purpose of limitation. While a specific complex lens design has been disclosed for illustrative purposes, it will be understood by those of ordinary skill in the art that various changes in form and details may be made without departing from the spirit and scope of the example embodiments. For example, only three surfaces may have optical power therein and/or the final surface may provide negative power.

What is claimed is:

1. A camera system, comprising:
   an optical assembly including a folded optic, the folded optic including:
   a transparent support substrate,
   a first lens surface on a first surface of the transparent support substrate,
   a second lens surface on the first lens surface of the transparent support substrate, wherein
   the first and second lens surfaces include
   a first lens shape,
   a reflective coating on a first portion of the first lens shape, and
   a second lens shape on at least a second portion of the first lens shape, the first lens surface including the first lens shape and the second lens shape and the second lens surface including the first lens shape and the reflective coating, and
   wherein a second surface of the transparent support substrate, the second surface being opposite the first surface, receives light from the first lens surface and directs light incident thereon towards the second lens surface; and
   a sensor configured to receive light from the optical assembly that has been incident on the first lens surface, the second surface of the transparent support substrate, and the second lens surface sequentially.

2. The camera system, as claimed in claim 1, further comprising: another support substrate secured along a z-axis to the support substrate, the another support substrate including a reflective surface.

3. The camera system as claimed in claim 1, wherein the first lens surface is a plano-convex surface.

4. The camera system as claimed in claim 1, wherein the optical assembly further includes a third lens surface on a second surface of the transparent support substrate, the second surface being opposite the first surface, the sensor configured to receive light from the first, third, and second lens surfaces sequentially.

5. The camera system as claimed in claim 4, wherein the first lens shape is in a first material, the second lens shape is in a second material, and the third lens surface is in a third material, different from the first material.

6. The camera system as claimed in claim 5, wherein the second material is the same as the first material, the first material and the substrate have substantially equal refractive indexes, and the third material has a greater refractive index than the first material and the substrate.

7. The camera system as claimed in claim 4, wherein the optical assembly further includes a fourth lens surface on the second surface of the transparent support substrate, the sensor being configured to receive light from the optical assembly that has been incident on the first, third, second, and fourth surfaces, sequentially.

8. The camera system as claimed in claim 7, wherein:
   the first lens surface is a first plano-convex surface, an aperture stop of the folded optic being at the first plano-convex surface,
   the second lens surface is a first concave reflecting surface,
   the third lens surface is a second plano-convex surface, and
   the fourth lens surface is a second convex reflecting surface.

9. The camera system as claimed in claim 8, wherein:
the first to fourth surfaces are all aspheric and all have optical power, with only the first plano-convex surface having a positive conic constant.

10. The camera system as claimed in claim 1, further comprising:
a third lens surface and a fourth lens surface on the first surface of the substrate; and
another sensor configured to receive light from the optical assembly that has been incident on the third lens surface, the second surface of the transparent support substrate, and the fourth lens surface sequentially.

11. The camera system as claimed in claim 10, wherein the third and fourth lens surfaces are mirror images of the first and second lens surfaces.

12. A portable device including the camera system as claimed in claim 1.

13. A method of making a camera system, the method comprising:
forming a first lens shape on a first surface of a transparent support substrate;
forming a reflective coating on a first portion of the first lens shape;
forming a second lens shape on at least a second portion of the first lens shape, wherein a first lens surface includes the first lens shape and the second lens shape and a second lens surface includes the first lens shape and the reflective coating, wherein a second surface of the transparent support substrate, the second surface being opposite the first surface, receives light from the first lens surface and directs light incident thereon towards the second lens surface; and
providing a sensor configured to receive light that has been incident on the first lens surface, the second surface of the transparent support substrate, and the second lens surface sequentially.

14. The method as claimed in claim 13, wherein forming includes:
forming the first lens shape on the transparent support substrate;
patterning a reflective material on the first portion of the first lens shape; and
replicating the second lens shape on the first lens shape after patterning the reflective material.

15. The method as claimed in claim 14, wherein forming the first lens shape includes replicating the first lens shape in a first material.

16. The method as claimed in claim 15, wherein forming the second lens shape includes replicating the second lens shape in a second material different from the first material.

17. The method as claimed in claim 14, wherein forming the second lens shape includes transferring the second lens shape into the transparent support substrate.

18. The method as claimed in claim 13, further comprising forming a third lens surface on a second surface of the transparent support substrate, the second surface being opposite the first surface, the sensor configured to receive light from the first, third, and second lens surfaces sequentially.

19. The method as claimed in claim 18, further comprising forming a fourth lens surface on a second surface of the transparent support substrate, the sensor being configured to receive light that has been incident on the first, third, second, and fourth lens surfaces sequentially.

20. The method as claimed in claim 18, wherein the first lens surface is formed in a first material, a second lens shape is formed in a second material, and the third lens surface is formed in a third material, different from the first material.

21. The method as claimed in claim 13, wherein forming the first and second lens surfaces includes forming a plurality of at least one of the first and second lens surfaces simultaneously on a first wafer.

22. The method as claimed in claim 21, wherein providing the sensor includes:
providing a plurality of sensors on a second wafer;
aligning and securing the first and second wafers; and
singulating the first and second wafers to form individual cameras.

23. The method as claimed in claim 22, wherein individual cameras are dual cameras, including two first lens surfaces, two second lens surfaces, and two sensors.

24. The method as claimed in claim 13, wherein forming the first and second lens surfaces includes forming the first lens shape in a first material and the second lens shape in a second material, different from the first material.

* * * * *